United States Patent [19]

Holman

[11] Patent Number: 4,640,736

[45] Date of Patent: Feb. 3, 1987

[54] WAVE GUIDE FABRICATION METHOD

[75] Inventor: Robert L. Holman, Pittsford, N.Y.

[73] Assignee: Xerox Corporation, Stamford, Conn.

[21] Appl. No.: 361,671

[22] Filed: Mar. 25, 1982

Related U.S. Application Data

[63] Continuation-in-part of Ser. No. 193,248, Oct. 2, 1980, abandoned.

[51] Int. Cl.[4] .................... G02B 5/14; B01B 9/00; C03C 21/00
[52] U.S. Cl. .................... 156/603; 156/605; 156/612; 156/DIG. 71; 156/DIG. 73; 156/DIG. 87; 156/DIG. 89; 350/96.12
[58] Field of Search .............. 156/DIG. 71, DIG. 73, 156/DIG. 89, 603, 605, DIG. 87; 350/96.12; 65/117, 30.13, 30.1

[56] References Cited

U.S. PATENT DOCUMENTS

| 4,071,323 | 1/1978 | Holman | 156/613 |
| 4,071,396 | 1/1978 | Holman | 156/612 |
| 4,196,963 | 4/1980 | Chen et al. | 350/96.12 |

OTHER PUBLICATIONS

Smith, Jl of Applied Physics, vol. 39, No. 10, 9/63.
Holman et al., Appl. Phys. Lett. 32(5) 3/78, pp. 280–283.
Peterson, Applied Physics Letters vol. 19, No. 5 9/71.

*Primary Examiner*—Gary P. Straub
*Attorney, Agent, or Firm*—Robert A. Chittum; John B. Mason

[57] ABSTRACT

A method for controlled fabrication of a waveguide region in a crystalline member, such as lithium niobate. The crystalline member is placed within a crucible which gives off the same metal component as the crystalline member at a predetermined temperature. Both the crystalline member and the crucible are heated in a controlled highly oxidizing atmosphere. During fabrication of the waveguide region, this atmosphere enhances oxidation of optical damage inducing impurities in the crystalline member. Waveguides so fabricated resist the development of laser induced optical damage.

4 Claims, 7 Drawing Figures

WAVE GUIDE FABRICATION METHOD

This application is a continuation-in-part application of application Ser. No. 193,248 filed Oct. 2, 1980, now abandoned.

BACKGROUND OF THE INVENTION

1. Field of the Invention

The present invention relates to electro-optic wave guides and more particularly to an electro-optic wave guide fabrication method for reducing the incidence of damage induced by light passing through the wave guide.

2. Prior Art

Scanning systems which utilize laser beams for transmitting information are known. U.S. Pat. No. 3,848,087, for example, entitled "Optical Scanner Control System" discloses a scanning system which utilizes a multifaceted mirror for delecting a light beam over a scanning area. As successive mirror facets rotate into the path of an incident light beam the beam repetitively sweeps across the scanning area. Systems which utilize apparatus such as that disclosed in the '087 patent have applications in both raster input scanning (RIS) and in raster output scanning (ROS). In raster input scanning, the light beam illuminates an original document line by line and enables the information contained in that document to be encoded through procedures known in the art.

According to the invention disclosed in U.S. Pat. No. 4,396,246 entitled "Integrated Electro-optic Wave Guide Modulator", granted Aug. 2, 1983, a single electro-optic wave guide substrate operating in line with a laser light source confines light energy from the source and both intensity modulates and deflects the energy as it passes through. Electrodes coupled to the substrate and also coupled to controlled sources of electrical energy provide the modulation and deflection by changing the light transmission characteristics of the substrate. The deflection capabilities of the substrate are such that after the modulated light beam leaves the substrate it can be made to track and remain substantially coincident with the center of a moving facet of a multi-sided mirror. This capability can be used to enhance the functioning of the raster output scanner in a manner previously achieved with more expensive and less efficient acousto-optic coupling devices.

The preferred wave guide substrate comprises a lithium niobate crystal having a thin wave guiding layer formed by controlled out diffusion of a chemical constituent of the lithium niobate. U.S. Pat. No. 4,071,396, for example, discloses a technique for out diffusing $Li_2O$ (lithium oxide) from a $LiNbO_3$ (lithium niobate) crystal by maintaining the lithium niobate crystal in vapor phase equilibrium with a specially constructed crucible. Controlled out diffusion using the technique disclosed in the '396 patent increases the refractive index of a thin surface layer thereby creating a wave guide.

A concern with prior art electro-optic wave guides is the incidence of optical damage caused by the optically coupled laser beam. The operational life of a lithium niobate wave guide is related to the degree to which it can resist optical damage since the development of optical damage increases the wave guides' insertion loss. To compete with a prior art acousto-optic modulator, for example, the electro-optic wave guide must have a mean time between failure of 40,000 hours.

SUMMARY OF THE INVENTION

To achieve adequate device lifetime, the present invention comprises an improved method for forming a wave guiding layer in a transparent crystalline solid. Practice of the invention decreases the incidence of optically induced damage and reduces the severity of the damage that does occur.

According to the invention a transparent crystalline member such as lithium niobate, or lithium tantalate is placed in a crucible having a cavity of predetermined dimensions such that the crystalline solid is substantially symmetrically separated from the walls of the cavity. The crucible is made from a material which gives off the same chemical component in the vapor phase as the crystalline member at a controlled temperature. At this temperature, the concentration of the chemical component in its vapor phase has a vapor pressure less than about $10^{-4}$ atmospheres. The crucible and crystalline member are maintained at this temperature for a controlled time period sufficient to form a wave guiding region along a surface of the crystalline member.

In addition to these fabrication techniques, according to the invention, the out diffusion process is conducted under the most chemically oxidizing conditions possible. Both the crystalline member and the crucible should be free from carboneous matter so the crystalline member is supported in the crucible by an inert oxide. Where the crystalline member is lithium niobate, for example, it should be supported in the crucible on a lithium niobate support. It has also been observed that the heating should be in an oxidizing atmosphere (pure oxygen at 1 atmosphere, although higher pressures can be used to increase the oxidizing atmosphere) and the water vapor partial pressure should be increased. Water vapor is believed to act as a catalyst which increases the rate of oxidation. As the water vapor diffuses into the crystal, it also acts as a source of additional electron trapping sites.

To achieve the preferred fabrication environment the crucible and crystalline member are heated in an oven containing pure oxygen which has been moistened to elevate its humidity. Using these fabricating techniques, wave guides sufficiently resistant to optical damage at moderate laser intensities have been produced. When so fabricated the wave guides are comparable to prior art acousto-optic wave guides on a mean time between failure basis. When so fabricated lithium tantalate wave guides damage as much as equivalent lithium niobate wave guides but at a laser power density more than thirty times lower.

Using this fabrication technique for crucible out diffusion, wave guides have been formed that develop less than 20% power loss due to optical damage when exposed to laser sources delivering 2–8 m watts or more power for periods of operation in excess of 40,000 hours. These performance figures make the wave guides suitable for using in a raster output scanner environment.

From the above it should be appreciated that one object of the present invention is to provide a method for fabricating electro-optic wave guiding materials which are resistant to optical damage induced by the laser beams they are designed to propagate. This and other features and objects of the present invention will be understood by reference to a detailed description of a preferred embodiment of the invention when considered in conjunction with the accompanying drawings.

DETAILED DESCRIPTION OF THE PREFERRED EMBODIMENT

Figure 1:
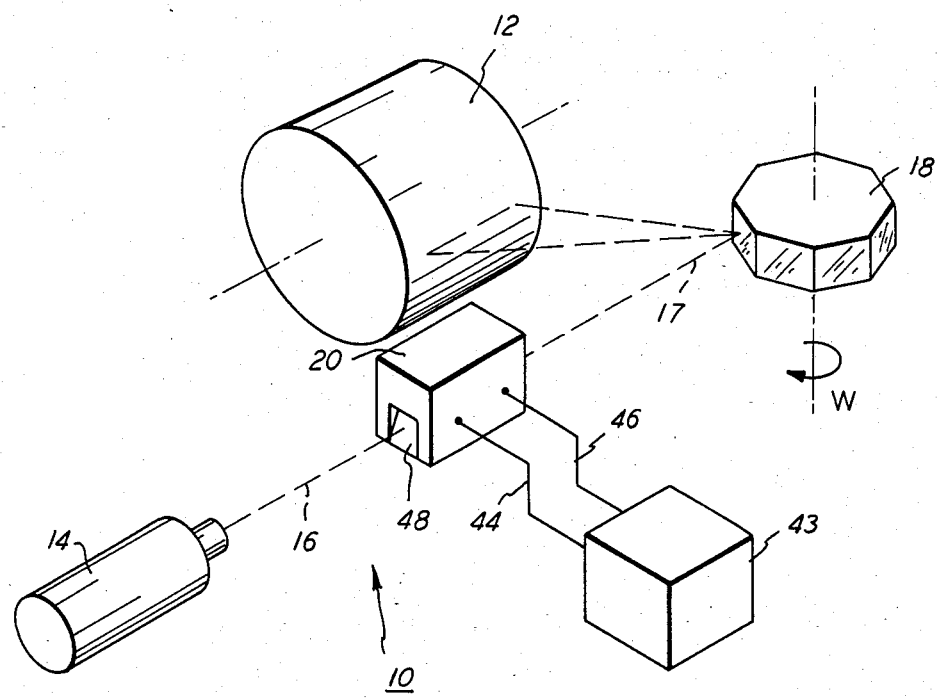
FIG. 1 is a schematic illustration of a raster output scanner having a beam modulator.

Turning now to the drawings, FIG. 1 shows an exemplary raster output scanning (ROS) system 10 which may, for example, be incorporated in an electrostatic copier for encoding a photoreceptor 12 or the like with information. One such scanning system is disclosed in U.S. Pat. No. 3,848,087 entitled "Optical Scanner Control System." The system 10 has a source 14 of moderate intensity light such as a He-Ne laser (2-8 m watts or more). A beam 16 of light generated by light source 14 is modulated and deflected by the modulator 20 of the present invention to encode the photoreceptor 12 with information as will appear.

Prior to being scanned by the light beam 16 the photoreceptor 12 is uniformly charged across its width by a charging device (not shown) and is rotated to a imaging station where a modulated light beam 17 scans the photoreceptor to encode information onto its surface. Those portions of the photoreceptor 12 which are contacted by the light beam 17 are discharged and those portions of the photoreceptor which are not contacted by the light 17 remained charged. Once the photoreceptor is encoded with information (line by line) that information may be developed and thereafter transferred to a copy sheet by techniques known in the xerographic art.

The system 10 includes a rotating multi-faceted mirror 18 which intercepts the modulated beam 17 output by modulator 20. The mirror rotation causes the beam to scan across the surface of photoreceptor 12 as the angle of incidence between the beam and the mirror facet changes. As will appear, the modulating device 20 intercepts the beam 17 and both intensity modulates and continuously controls the light beam deflection, the latter assuring that the beam 17 to be directed to the center of a particular facet on the the multi-faceted mirror 18 whatever the incident angle between beam 17 and mirror 18. By enabling the amount of deflection to be continuously changed, modulator 20 permits the beam to be centered on each mirror facet as the mirror rotates. The deflection angle depends on the distance between the modulator 20 and the mirror 18. Only a small deflection angle is required (1-10 mRad). The more critical specification is that the modulator 20 form two resolvable spots. Once the modulated beam completely sweeps across the photoreceptor 12, the beam is allowed to "flyback" to a beginning point to track the center of the next mirror facet in its rotational path.

Figure 2:
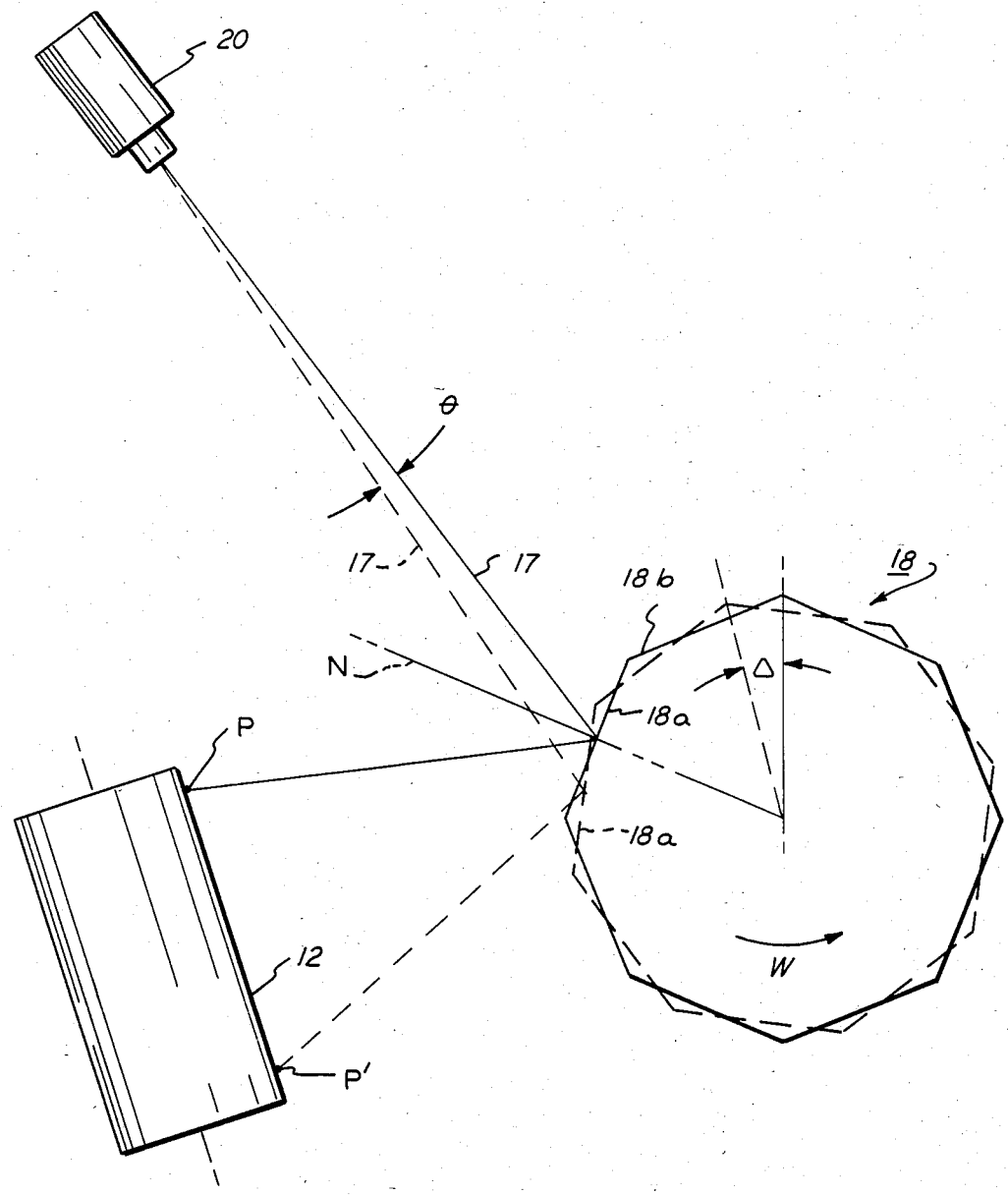
FIG. 2 is a schematic plan view of a rotating multi-faceted mirror showing how each facet center is tracked through use of the present invention.

FIG. 2 further illustrates the facet tracking of the polygon mirror 18. At an initial position the modulated beam 17 contacts a facet 18a at approximately its center and is reflected to a point P on the photoreceptor 12. As the mirror 18 rotates the angle of incidence the beam 17 makes with the facet 18a changes to cause the beam to sweep across the photoreceptor 12. At a later point in time, the mirror 18 has rotated through an angle such that the beam 17 now strikes the photoreceptor 12 at a point P'. To cause the beam 17 to track the center of the facet 18a the beam 17 is deflected through an angle $\theta$. As the mirror 18 continues to rotate a next facet 18b rotates into a position where the beam 17 can be directed to the center of that next facet 18b. To do so, however, it should be appreciated that the beam 17 must flyback to its initial position as shown in FIG. 2.

Figure 3:
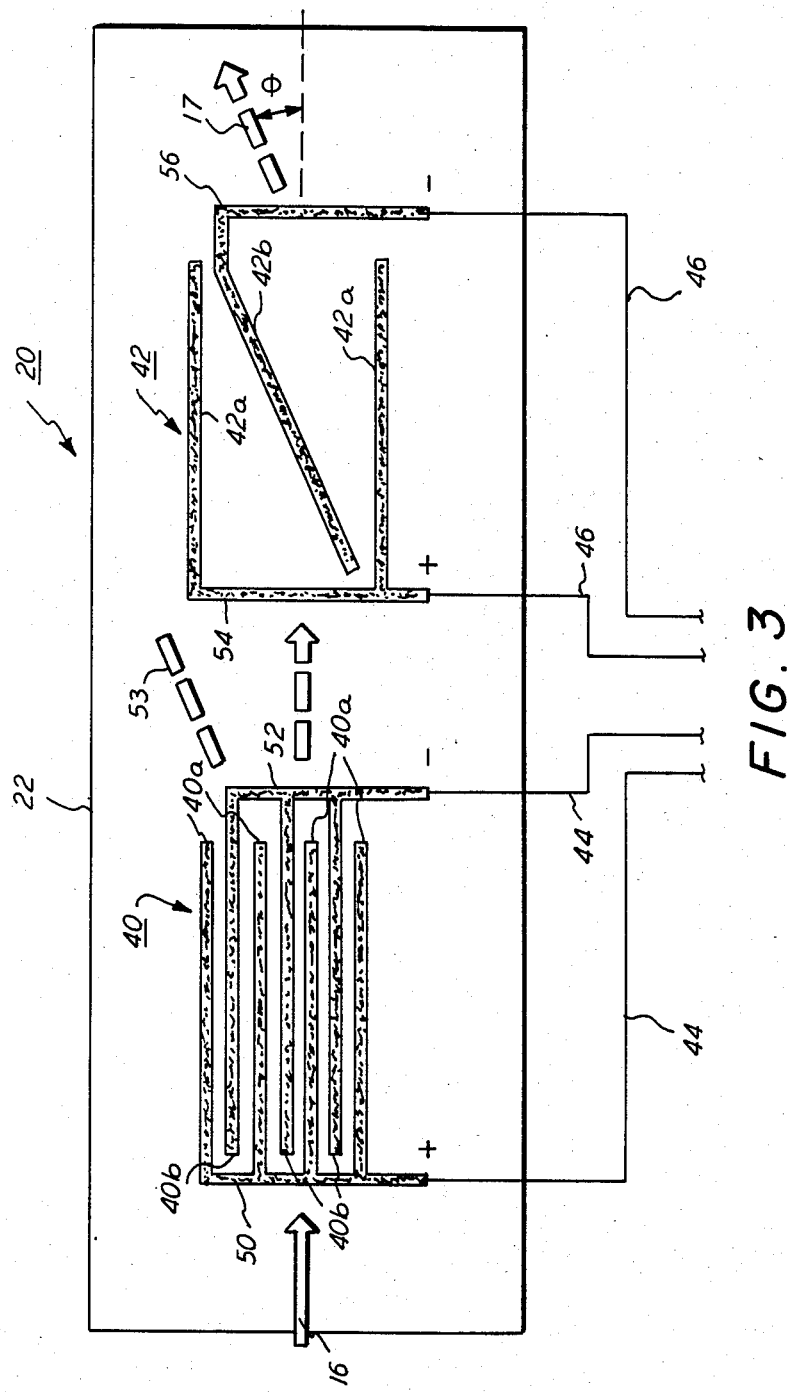
FIG. 3 is a schematic plan view of the modulator showing two control electrode configurations.

The modulator 20 comprises an electro-optic wave guide formed from a single substrate 22 (FIG. 3). In the preferred embodiment of the invention the substrate material comprises lithium niobate. Techniques for producing lithium niobate (or tantalate) wave guide devices are known and one such technique is disclosed in U.S. Pat. No. 4,071,396 entitled "Controlled Atmosphere Process for Altering the Non-stoichiometry of Crystalline Member" which has been assigned to the assignee of the present invention. That application is also incorporated herein by reference. According to the technique disclosed in that application, optical polished lithium niobate wafers which are commercially available are cleaned and batch heat treated in a special furnace or oven.

Figure 5:
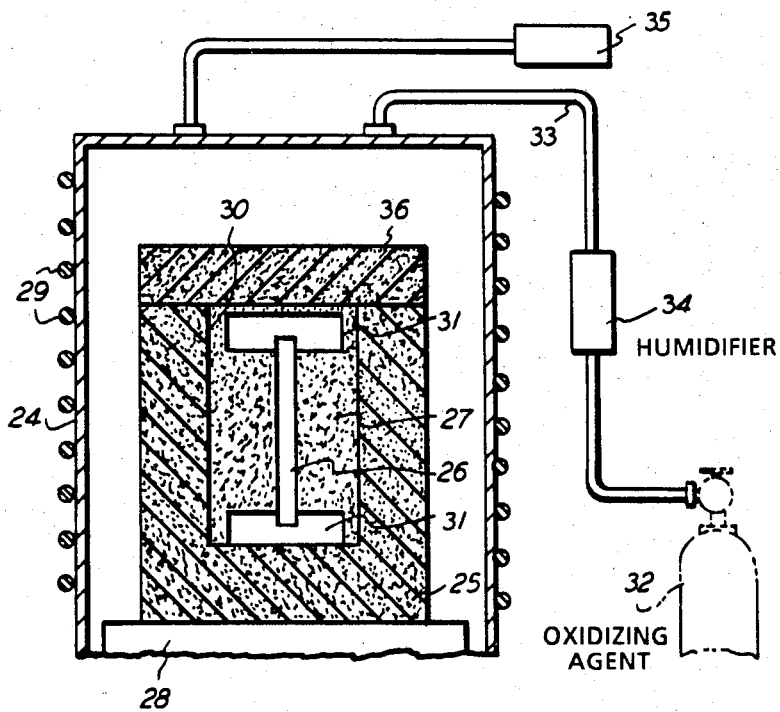
FIG. 5 is a schematic showing apparatus for producing a wave guide substrate to which the electrode configuration is affixed.

FIG. 5 illustrates one such oven 24 surrounding a crucible 25 which supports a crystalline member 26 such as lithium niobate. The crucible 25 comprises a material having a vapor phase in common with the crystalline member 26 as represented by the dots 27. The crucible 25 sits on a pedestal 28 so that the pedestal 28 and crucible 25 can be place inside the oven 24 and heated with heating elements 29 which surround the oven's exterior.

The crucible 25 is preferably composed of two or more homogeneously mixed equilibrium phases. For example, Li Nb O$_3$ and Li Nb$_3$O$_8$ comprise such a combination if the mole fractions of Li$_2$O and Nb$_2$O$_5$ are 0.40 and 0.60 respectively. This example is illustrative and as taught in the '396 patent other percent concentrations could be used in fabricating the crucible including the usage of pure Li Nb$_3$O$_8$. Choice of the mixture needed to create a proper atmosphere for outdiffusion of the lithium niobate is determined empirically. About 20% by volume of finely crushed napthalene crystals are added to act as a binder and porosity control. Once a crucible structure is formed, the napthalene is burned out slowly by heating the crucible for 12 hours at 250° C. Finally the crucible is calcined in air (or oxygen) for 12 hours at 1000° C., then for 100 hours at 1100° C.

The crystalline member 26 is supported in a cavity or slot 30 defined by the crucible. The slot has physical dimensions such that the spacing between its interior walls and the crystalline member 26 is sufficiently small to produced mass transport under equilibrium conditions. One to three millmeters is satisfactory for the crucible materials listed above.

The crystalline member 26 is held in place by top and bottom supports 31 comprising an inert oxide, such as lithium niobate. It has been found that other materials, such as platinium, which were used to support prior art substrates tend to promote reduction and therefore reduce the substrate's resistance to optical damage.

Optical damage refers to a localized variation of the substrate's refractive index brought about electrooptically, by a laser-induced separation of charge, occurring along an axis transverse to the laser beam direction of propagation. The mechanism responsible for a directional displacement of electrons within the substrate has not been established convincingly but it is generally believed to be associated with the lithium niobate's ferroelectric asymmetry.

The charge separation producing electrons are photogenerated predominately from $Fe^{+2}$ substitutional lattice sites lying about 2.6 eV below the conduction band. They are trapped at a lattice site (presumably oxygen vacancies) with an activation energy of about 1.1 eV. The resulting space-charge fields persist for a time duration which depends upon the dark resistivity of the crystal (months at room temperature, seconds at 150° C.). When such refractive index damage is induced in a bulk crystal, two effects occur simultaneously. The birefringence of the crystal changes locally, causing the wave front of the laser beam to become distorted. The induced birefringence is a function of position in the crystal and its magnitude saturates in time. Wave front distortion is caused by the gradient in birefringence, which in turn, causes a de-focussing of the laser beam. On the other hand, when such refractive index damage is induced in a wave guide, it reduces (and eventually distorts) the wave guide's gaussian output beam intensity by asymmetrically deflecting or scattering light within the plane of the wave guide. When damage occurs at a modest level, power is scattered away from the direction of propagation. The induced scattering builds up gradually and without an apparent threshold, to a saturation value determined by the laser's power density. The development of optical damage is more severe at shorter laser wavelengths, higher laser power densities, and in wave guides formed with increased concentration of photoionizable donor impurities.

The degree of optical damage in crystals has been correlated with the net number of donor electrons available for displacement, while the rate with which the damage builds up, is believed to be influenced by the effective number of electron trapping states and their activation energy. Increased electron trapping can reduce the electron mobility, reducing the rate of electric field buildup, and thereby reducing the rate of optical damage. When the concentration of electron donor impurities ($Fe^{+2}$) can be reduced through oxidation, the concentration of laser displaced electrons can be reduced.

To both increase the oxidation of substrate impurities and increase electron trappings the oven 24 is filled with moist oxygen rather than air. An oxygen source 32 supplies oxygen to the oven interior through a conduit 33 which includes a humidifier 34. By controlling the oxygen pressure and humidity, a reduction in impurities through oxidation of $Fe^{+2}$ iron to $Fe^{+3}$ iron oxide and an increase in electron trapping sites is achieved.

The control over the humidity was believed to be important since a correlation was formed between optical damage and the concentration of $OH^-$ ions in bulk crystals of lithium niobate heated in the presence of an applied electric field. In the present case when the wave guide is prepared in a moist environment without an electric field and the improvement in performance is attributed to the catalytic effect HOH has in increasing the speed with which the system reaches equilibrium with the highly oxidizing atmosphere provided by the diffusion crucible 25 and the pure oxygen inside the oven 24. In addition further improvement is related to the replacement of oxygen ions and/or vacancies by hydroxy ($OH^-$) ions in the substrate's crystal lattice. This replacement increases the crystal's electron trapping cross section, thus inhibiting the development of optical damage. A preferred oven would contain essentially pure oxygen having a relative humidity of over 50%. To achieve this controlled environment the oven is first evacuated to a low pressure by a vacuum pump 35 and then pressured with humid oxygen from the source 32.

Since the crucible is porous, the heated, moist oxygen flows through it to the substrate 26. To enhance temperature uniformity within the cavity 30 a cap 36 comprising the same compounds from which the crucible is made is placed over the crucible cavity 30.

Wave guiding properties are exhibited by lithium niobate crystals when heated in the oven 24 at 1100° C. for 0.1, 0.2, 0.4, 1, 4 16 and 24 hours. By such heating a nonstoichiometeric condition is created at the surface of the crystalline member 26. Increased heating times increases the depth inside the crystal to which this nonstoichmetric condition diffuses.

A more significant improvement in the damage resistance of a waveguide is obtained by utilizing an atmosphere which is more highly oxidizing than the oxygen atmosphere discussed above. That is to say, further improvements in a waveguide's damage resistance is provided by conducting the waveguide fabrication process in an atmosphere having a higher oxidation potential than would be provided by an atmosphere of oxygen at a pressure of one atmosphere. Suitable oxidizing agents for this alternate process include ozone and single oxygen, either as separate atmospheres or a components of an atmosphere including oxygen, water vapor, or oxygen and water vapor. Other exemplary, but not exclusive, oxidizing agents include the noble gas fluorides such as xenon difluoride, xenon hexafluoride, krypton difluoride, or salts thereof, and platinum hexafluoride, or salts thereof. Exposure of the waveguide crystal to these additional oxidizing agents, at a temperature selected between room temperature and approximately 1000° C. produces additional oxidation of the crystals multi-valent impurities, such as iron, which are associated with optical damage.

Alternately, the oxidizing processing step of the present invention can be utilized as a post-treatment to improve the damage resistance of a preformed waveguide. To achieve this, the preformed waveguide is placed in a chamber and annealed, in the presence of a chosen oxident, for a time period and at a temperature adjusted to control the degree of oxidation. For example, the performance of a lithium niobate waveguide prepared under oxidizing conditions would be improved by heating it in the presence of ozonized oxygen at 150° C. for one to one hundred hours or longer.

It is to be noted that this proposed treatment process improves the damage resistance of lithium niobate or lithium tantalate waveguides prepared by crucible outdiffusion as well as waveguides prepared by any other means, e.g. titanium-in-diffusion. For example, a very damagable titanium-in-diffused waveguide was heat treated for two hours at 150° C. in an atmosphere of oxygen plus approximately 4% ozone and a partial pressure of water. The power loss in this waveguide was reduced from 85% before treatment to 25% after treatment at a power level of 0.44 milliwatts.

By way of additional example, a more damage resistant titaniumin-diffused waveguide was initially treated in a similarly ozonized (but not moisturized) atmosphere for two hours. At full equilibrium (i.e. after being subjected for 170 hours to a laser emitting at 632.8 nm and 0.44 milliwatts) this waveguide exhibited a 40% power loss (a slight improvement over the resistance of the untreated waveguide). Repeating the heat treatment with a moistened ozonized oxygen atmosphere yielded a pronounced improvement in the damage resistance of this waveguide. At the standardized power level noted above, the optical damage was reduced to only 10% at equilibrium.

Once the lithium niobate substrate has been processed to include a wave guiding layer to confine the laser beam path of travel in a well defined region 38 (FIG. 4) of the substrate the beam can be intensity modulated and directed by two sets of electrodes, 40, 42 (FIG. 3). These electrodes are positioned along the confined path of beam travel and are coupled to a control module 43 by conductors 44, 46.

Figure 7:
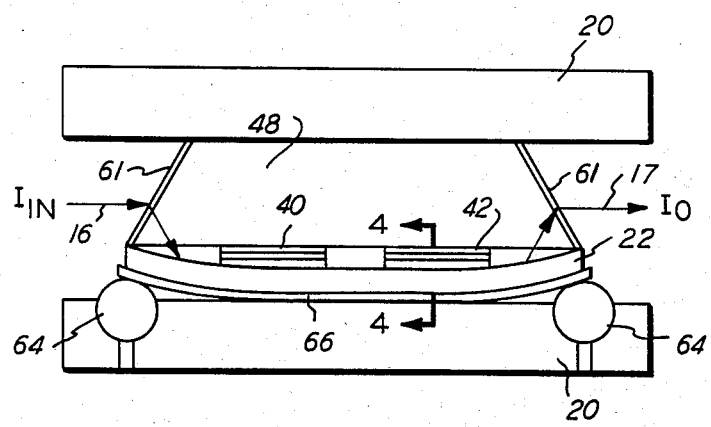
FIG. 7 is a schematic elevation view of the modulator showing a beam input and output coupling technique.

To fabricate the electrodes 40, 42, the surface of the lithium niobate wave guide substrate 22 is covered with some suitable dielectric such as titanium dioxide or silicon dioxide 41 using vacuum deposition techniques known in the art to provide optical isolation between the wave guide region 38 and the electrodes 40, 42. The presence of the titanium dioxide or silicon dioxide 41 reduces the wave guide's insertion loss without seriously reducing the magnitude of the electromagnetic fields which penetrate the wave guide 38 in response to controlled energization of the electrodes 40, 42. After the titanium dioxide or silicon dioxide is applied to the wave guide, successive layers of chromium 45, gold 47, and chromium 49 are applied to form the electrode patterns illustrated in FIGS. 3 and 4. The first chromium layer 45 acts as an adhesion inhibitor between the silicon dioxide and the gold 47, and the second chromium layer 49 performs a similar function between the gold 47 and an upper silicon dioxide region 51. As will be discussed, the geometrical configuration of electrodes 40, 42 is important in achieving combined intensity and deflection modulation on a single substrate. Finally, a layer of magnesium fluoride or silicon dioxide 51 is placed over the electrodes to protect them and to allow optical coupling of the substrate to the laser through a prism 48 (FIG. 7).

The first set 40 of electrodes, as known in the art, is used to modulate the beam 16 and comprises a set of parallel and periodically interdigitated electrode segments 40a, 40b. The segments 40a are connected to a first perpendicularly oriented bus segment 50 while alternate segments 40b are connected to a second perpendicularly oriented bus segment 52. Segments 50, 52 are, in turn, coupled to one set of conductors 44.

Application of an appropriate voltage to segments 40a, 40b creates an electrically controllable phase grating in the substrate structure. With the disclosed electrode arrangement, it has been found that a constant direct voltage potential (D.C.) can be applied across the electrode segments 50, 52 when the beam is to be turned off. Alternately, a bipolar square wave symmetric about ground can be applied to the perpendicularly oriented segments 50, 52. Either energization technique achieves intensity modulation by controlled diffracting of the incoming laser beam. This diffraction is achieved alternately and periodically by lowering and raising the refractive index of the niobate substrate via the electro-optic effect. As a result, light is diverted away from the lower index of refraction region to adjacent side bands 53 whose orientation depends on the electrode geometry. By controlled application of either the D.C. or square wave signal to the first electrode set 40, information can be encoded onto the laser beam and, in turn, transmitted to the multi-faceted mirror 18 for deflection to the photoreceptor 12. Use of bipolar drive is preferred with lithium niobate to prevent field assisted laser induced degrading effects from occurring.

With regard to beam modulation using controlled diffraction, it should be appreciated that the diffracted beam could be transmitted through the wave guide to the photoreceptor and the non-diffracted beam could have an angle of incidence such that it would never exit the wave guide. Application of a controlled D.C. or bipolar signal in this configuration would refract the beam away from its incident path to a direction which would allow the second electrode set 42 to control beam transmittal to the mirror 18.

The second electrode set 42 is used to control deflection of the modulated beam from the first electrode set 40. Energization of the second electrode set 42 causes the modulated zero order laser beam to be deflected continuously within the plane of the wave guide. The second electrode set is composed of a first segment having opposed parallel electrodes 42a and a second segment having an electrode 42b extending between electrodes 42a and at an angle with respect thereto.

Figure 6:
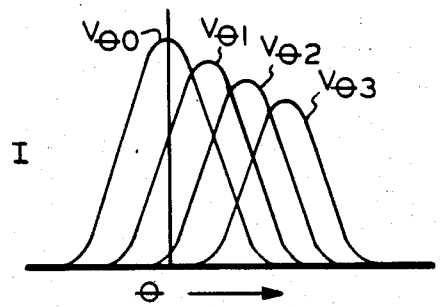
FIG. 6 shows the deflection capability as a function of applied voltage for one of the FIG. 3 electrodes.

The second electrode set is energized by a direct current voltage difference applied to electrodes 42a, 42b through two bus portions 44, 46. As the modulated beam output by the first electrode set passes beneath the energized second electrode set the beam is deflected in proportion to the magnitude of voltage applied across the electrode 42a, 42b. FIG. 6 shows beam intensity as a function of deflection angle $\theta$ for various applied voltages $V_{\theta o}$, $V_{\theta 1}$, $V_{\theta 2}$, etc. when $V_{\theta o}=0$ volts and $V_{\theta 1}$ etc. are increments of voltages applied to the electrodes 42a, 42b. By coordinating changes in the input voltage to the second electrode set with the rotation of the multi-faceted mirror 16, the laser beam is deflected to track the center of successive facets on the multi-faceted mirror 18.

For example, application across the two electrodes 42a, 42b of a sawtooth wave form centered about ground causes the modulated beam to continuously sweep through an angle of $\theta$ (FIG. 2) as the wave form sweeps from its maximum negative to maximum positive value. By coordinating the sawtooth wave form with rotation of the mirror 18, the modulated beam is caused to track the center of successive mirror facets as they rotate about the mirror axis of rotation 58. In this example, the frequency of the sawtooth wave form must be Nw, where N is the number of facets on the mirror and where w is the angular mirror speed in rotation per time period.

The disclosed intensity modulator and beam deflector electrode sets can be applied to a single substrate as small as 15 mm×3 mm×0.075 mm or smaller. Application of a 25–50 volt potential difference to the second electrode set can result in a beam deflection as large as 5mRad in two resolvable spots which is adequate for continuously scanning a polygon mirror of conventional ROS systems.

As an alternative embodiment of the invention the substrate 22 can be rotated 90° about an axis coincident with the incident laser beam 16 to perform the raster output scanning in a slightly different manner. When so rotated, the second set of electrodes 32 will vertically rather than horizontally deflect the beam transmitted by the substrate. This capability allows the modulated beam to scan a mirror 18 which wobbles about the axis of rotation 48. In this mode of operation, the laser beam is no longer centered in a facet but instead scans the mirror 18 to maintain scan line position across the photoreceptor as vibration or wobble change the incident angle with which the modulated mirror strikes the mirror.

Figure 4:
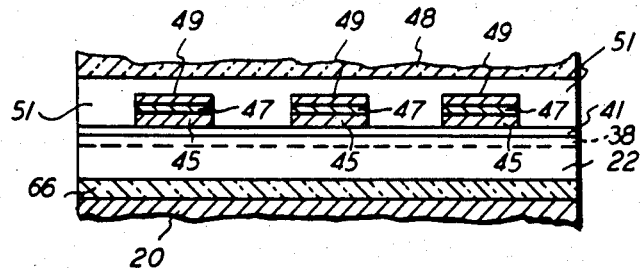
FIG. 4 is a cross sectioned view showing the electrode fabrication design.

FIG. 7 shows an improved optical coupling technique for the present invention. An input beam 16 in from the source 14 is directed to an angled surface of a truncated rod-like prism 48. The incident beam is refracted by the prism, crosses a tapered air gap and enters the wave guide portion 38 of the modulating device 20 and is transmitted through the wave guide along a path directly beneath the electrode sets 40, 42. The now modulated and deflected modulated beam 17 exits the lithium niobate substrate 22, crosses a second air gap, passes through a portion of the prism 48 and once again is refracted by the prism/air interface toward the multifaceted mirror 18. Optical coupling techniques such as that illustrated in FIG. 4 are known and in particular details of that optical coupling are available through reference to an article co-authored by applicant entitled "A Very High Throughput Damage Resistant Lithium Niobate Wave Guide Modulator". That article is incorporated herein by reference. The prism 48 is formed with 52.5° face angles so that the input beam 16 is directed in line with the prism's base. The input and output faces 61 are coated with layers of magnesium fluoride (or silicon dioxide) of a thickness to cut the reflectivity of those faces to less than one percent. The prism 48 and wave guide with the electrodes 40, 42 attached are combined in the modulator 20. The modulator 20 further comprises two 0.125" diameter stainless steel balls 64 spaced 12–16 mm apart and aligned with the centerline of the electrodes 40, 42. The height of the balls 64 is adjusted to deflect the substrate 22 against the prism 48 thereby forming aligned input and output coupling regions.

Other optical coupling techniques are known and could be utilized for optically coupling an input laser beam to the lithium niobate substrate 22. Other such alternative techniques employ direct coupling to the wave guide's end-fire, or utilizing an input grating or optical fiber input.

Interposed between the substrate 22 and the stainless steel balls 64 is a glass slide 66 which protects the substrate 22 from damage by the steel balls 64. The slide 66 can be made of conventional glass or alternatively may comprise a NESA (registered trademark) glass material commercially available from the Corning Glass Company) with two electrodes for electrical energization. For a NESA slide with dimensions of 4 mm×20mm×1 mm application of 800 mw of electric power to the slide 66 raises its surface temperature to 150° C. If the modulator 20 has insulating walls the power requirements to maintain the substrate 22 at an elevated temperature are reduced. By operating the modulators 20 at elevated temperatures the incidence of optical damage is reduced and the device's performance will be unaffected by changes in the ambient temperature of the scanning system. This last feature is important if the optics are to be aligned properly and to remain aligned during scanning as ambient temperature fluctuations occur greater than about ±0.5° C.

To use the present invention for Raster Input Scanning (RIS) the controlled intensity modulation is no longer necessary. The incident beam 16' can be directed to the second electrode set 42 unmodulated and that second set 42 can be controlled to facet track the rotating mirror 18.

While a preferred embodiment of the present invention has been described with a degree of particularity, certain design modifications or changes could be made in the system and, in particular, the control voltages and control circuitry coupled to the electrodes could be generated in a number of different ways. Thus, it is intended that all modifications or alternatives falling within the spirit or scope of the appended claims be covered by the present invention.

I claim:

1. A method of forming a wave guiding layer in a transparent crystalline member comprising the steps of:
   (a) placing said transparent crystalline member in a crucible having a cavity of dimensions such that said crystalline member is substantially symmetrically separated from the walls of said cavity in said crucible by a distance up to approximately 3 millimeters, said crucible comprising a material which gives off the same chemical component in the vapor phase as said transparent crystalline member at a predetermined temperature, said chemical component in the vapor phase having a vapor pressure less than about $10^{-4}$ atmosphere at said predetermined temperature;
   (b) isothermally heating said transparent crystalline member and said crucible at said predetermined temperature in a chamber;
   (c) providing a controllable atmosphere in said chamber which surrounds said transparent member and said crucible, said atmosphere having a more highly oxidizing atmosphere than one including only an oxygen ($O_2$) and moisture content by including ozone and/or single oxygen either alone or in combination with oxygen ($O_2$), water vapor, or oxygen ($O_2$) and water vapor together; and
   (d) maintaining said isothermal heating of the transparent crystalline member and crucible in said atmosphere at said predetermined temperature for a predetermined time and at a pressure of one atmosphere, so that a wave guiding layer is produced along the surface of said transparent crystalline member which has increased optical damage resistance.

2. The method of claim 1, wherein the transparent crystalline member is lithium niobate or lithium tantalate, wherein the predetermined temperature is 1100° C., and wherein the predetermined time period is from 0.1 to 24 hours, the time period being determined upon the depth of the wave guiding layer desired.

3. A method of post-treating a pre-formed wave guide to improve its damage resistance comprising the steps of:
   (a) placing the pre-formed wave guide in a chamber having a controllable atmosphere therein, said atmosphere including ozonized oxygen; and
   (b) isothermally heating the pre-formed wave guide in the controllable atmosphere of the chamber at a predetermined temperature for a period of time from one to 100 hours, depending on the degree of oxidation desired.

4. The method of claim 3, wherein the wave guide material is lithium niobate, the atmosphere further includes moisture, and the predetermined temperature is 150° C.

* * * * *